United States Patent
Kumar et al.

(10) Patent No.: US 7,606,780 B1
(45) Date of Patent: *Oct. 20, 2009

(54) SEARCH DIRECTIONS IN PATTERN SEARCH VIA ROTATION

(75) Inventors: Rakesh Kumar, Tampa, FL (US); Jared Carlson, Arlington, MA (US)

(73) Assignee: The Math Works, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/900,787

(22) Filed: Sep. 12, 2007

Related U.S. Application Data

(63) Continuation of application No. 11/015,877, filed on Dec. 17, 2004, now Pat. No. 7,340,441.

(51) Int. Cl.
  *G06F 17/00* (2006.01)
  *G06N 5/02* (2006.01)
(52) U.S. Cl. ...................................................... 706/46
(58) Field of Classification Search .................... 706/46
  See application file for complete search history.

(56) References Cited

U.S. PATENT DOCUMENTS

| | | | |
|---|---|---|---|
| 5,058,034 A | 10/1991 | Murphy et al. | |
| 5,195,026 A * | 3/1993 | Nonaka et al. | 700/47 |
| 5,390,284 A * | 2/1995 | Ogata et al. | 706/25 |
| 5,418,778 A * | 5/1995 | Cummiskey et al. | 370/291 |
| 7,231,376 B1 * | 6/2007 | Gurtuna et al. | 706/12 |
| 7,243,023 B2 * | 7/2007 | Skilton | 701/124 |
| 7,287,000 B2 * | 10/2007 | Boyd et al. | 705/10 |
| 7,295,702 B2 * | 11/2007 | Vrhel | 382/165 |
| 7,297,479 B2 * | 11/2007 | Mills, Jr. | 435/6 |
| 7,299,135 B2 * | 11/2007 | Thayer | 702/21 |
| 7,333,851 B2 * | 2/2008 | Echauz et al. | 600/544 |
| 7,340,441 B1 * | 3/2008 | Kumar et al. | 706/46 |
| 7,343,222 B2 * | 3/2008 | Solomon | 700/245 |
| 7,358,978 B2 * | 4/2008 | Guo et al. | 345/646 |
| 7,363,280 B2 * | 4/2008 | Jin et al. | 706/13 |
| 7,387,457 B2 * | 6/2008 | Jawerth et al. | 400/489 |
| 7,395,253 B2 * | 7/2008 | Mangasarian et al. | 706/46 |
| 7,406,450 B2 * | 7/2008 | Graf et al. | 706/15 |
| 7,415,136 B2 * | 8/2008 | Gallagher et al. | 382/110 |
| 7,428,514 B2 * | 9/2008 | Jin et al. | 706/13 |
| 7,440,823 B2 * | 10/2008 | Yamamura et al. | 701/1 |

(Continued)

OTHER PUBLICATIONS

The Reconfiguration Problem in Sensor Networks: An Optimization Approach E.M. Ould-Ahmed-Vall; G.F. Riley; B.S. Heck; Principles of Advanced and Distributed Simulation, 2006. PADS 2006. 20th Workshop on 2006 pp. 130-130 Digital Object Identifier 10.1109/PADS.2006.35.*

(Continued)

*Primary Examiner*—Michael B Holmes
(74) *Attorney, Agent, or Firm*—Lahive & Cockfield, LLP; Kevin J. Canning

(57) ABSTRACT

In performing a pattern search algorithm to find an optimal solution for an optimization, using a set of positive basis vectors that is non-maximal like a set of minimal positive basis vectors as search directions can sometimes causes the algorithm to converge at a non-optimal solution, like a horse saddle. The present invention provides a method to overcome this deficiency by rotating the vectors and hence increase the number of search directions.

21 Claims, 5 Drawing Sheets

U.S. PATENT DOCUMENTS

| | | | |
|---|---|---|---|
| 7,469,065 B2 * | 12/2008 | Kecman et al. | 382/232 |
| 7,512,276 B2 * | 3/2009 | Fung et al. | 382/225 |
| 7,516,423 B2 * | 4/2009 | De Smedt et al. | 716/1 |
| 7,526,460 B2 * | 4/2009 | Solomon | 706/14 |
| 7,539,533 B2 * | 5/2009 | Tran | 600/509 |
| 2004/0030665 A1 | 2/2004 | Sullivan | |

OTHER PUBLICATIONS

A New Support Vector Machine and Its Learning Algorithm Haoran Zhang; Changjiang Zhang; Xiaodong Wang; Xiuling Xu; Xiushan Cai; Intelligent Control and Automation, 2006. WCICA 2006. The Sixth World Congress on vol. 1, pp. 2820-2824 Digital Object Identifier 10.1109/WCICA.2006.1712879.*

A new approach for solving vector optimization problems Schatzer, Ch.; Binder, A.; Muller, W.; Magnetics, IEEE Transactions on vol. 36, Issue 4, Part 1, Jul. 2000 pp. 1071-1075 Digital Object Identifier 10.1109/20.877626.*

An Equivalent Vector Optimization Problem for Nonsmooth Multiobjective Programming Problem Shu-li Xu; Jun Jiang; Qiu-ting Wang; Fuzzy Systems and Knowledge Discovery, 2007. FSKD 2007. Fourth International Conference on vol. 3, Aug. 24-27, 2007 pp. 514-517 Digital Object Identifier 10.1109/FSKD.2007.154.*

Vector quantization of images using neural networks and simulated annealing Lech, M.; Hua, Y.; Neural Networks for Signal Processing [1991]., Proceedings of the 1991 IEEE Workshop Sep. 30-Oct.1, 1991 pp. 552-561 Digital Object Identifier 10.1109/NNSP.1991. 239486.*

Computational Intelligence Method in Multi-Objective Optimization Yeboon Yun; Min Yoon; Nakayama, H.; SICE-ICASE, 2006. International Joint Conference Oct. 18-21, 2006 pp. 6017-6022 Digital Object Identifier 10.1109/SICE.2006.315848.*

Optimisation on support vector machines Pedroso, J.P.; Murata, N.; Neural Networks, 2000. IJCNN 2000, Proceedings of the IEEE-INNS-ENNS International Joint Conference on vol. 6, Jul. 24-27, 2000 pp. 399-404 vol. 6 Digital Object Identifier 10.1109/IJCNN. 2000.859428.*

Bifurcation points and loadability limits as solutions of constrained optimization problems Vournas, C.D.; Karystianos, M.; Maratos, N.G.; Power Engineering Society Summer Meeting, 2000. IEEE vol. 3, Jul. 16-20, 2000 pp. 1883-1888 vol. 3 Digital Object Identifier 10.1109/PESS.2000.868821.*

* cited by examiner (Before Rotation)   (After Rotation)

SEARCH DIRECTIONS IN PATTERN SEARCH VIA ROTATION

RELATED APPLICATION

This application claims the benefit of U.S. patent application Ser. No. 11/015,877, filed Dec. 17, 2004, the contents of which are hereby incorporated by reference.

FIELD OF THE INVENTION

The claimed invention is related to utilizing a pattern search algorithm in a technical computing environment.

BACKGROUND

Optimization is a process to find an optimal set of parameters in order to maximize or minimize certain objectives. Without any loss of generalization, the discussion below will assume that the objective always is to be minimized. The process of optimization is usually iterative. For example, the process starts with an initial guess $X_0$ and produces a sequence of iterates $X_1, X_2 \ldots X_k$ until some terminating condition is satisfied. An optimization problem in general form can be written as follows:

Minimize $f(X)$, $X \in R^n$, $f \in R$ where f is the objective function to be minimized and X is the vector of variables. R represents all real numbers and $R^n$ represents all real numbers in n-dimensions.

There are many optimization techniques by which one can generate a sequence of iterations. One class of techniques that are of interest is direct search methods, specifically the ones utilizing the pattern search algorithm. Direct search methods do not require or estimate the derivative of the objective function like other classical optimization techniques. Direct search optimization techniques evaluate the objective function at a set of points around the current iterate $X_k$ in order to choose the next iterate to use in the next iteration.

The steps in a typical pattern search algorithm are described below.

Initialization of the algorithm $X_0$ is the chosen initial iterate.

$\Delta_{tol} > 0$ is the tolerance on the pattern size.

$\Delta$ is set to the initial value of the pattern size.

Body of the algorithm

Step 1: For j=0, 1, ... k, perform steps 2 to 4 unless $\Delta < \Delta_{tol}$, then terminate loop.

Step 2: A set of points, which is called a pattern, is created around the current iterate $X_j$. Each point in the pattern is situated at a distance, equal to the pattern size, away from the current iterate.

Step 3: If a point within the pattern has a lower output comparing to $X_j$ when provided as input to the objective function is found in the pattern, the point is marked as the new iterate $X_{j+1}$. Increment j by 1 and go back to step 1.

Step 4: If such a point is not found in the pattern, the pattern size $\Delta$ is reduced. The current iterate $X_j$ is not changed and j is incremented. Go back to step 1.

If the pattern search algorithm cannot find any improvement in the output (step 4) over the current iterate, the iteration is declared unsuccessful and the pattern size is reduced. If the iteration is unsuccessful, the algorithm checks if the current pattern size is small enough to stop the algorithm in step 1.

A pattern in a pattern search algorithm is typically constructed using a set of vectors which form a positive basis. A positive combination of $v_i \in R^n$: i=1, 2, ... k can be expressed as $$\sum_{i=1}^{k} \alpha_i v_i = \alpha_1 v_1 + \ldots + \alpha_k v_k,$$

where $\alpha_i$ is scalar and not less than zero. A finite set of vectors $v_i \in R^n$: i=1, 2, ... k forms a positive basis set B in $R^n$ if any vector $v \in R^n$ can be expressed as a positive combination of the vectors in B.

It is common to use two kinds of positive basis sets as search directions in pattern search algorithms, namely maximal basis and minimal basis. It is known that the maximal and minimal basis set have 2n and n+1 vectors, respectively, for an n-dimensional optimization problem. FIG. 1A shows an exemplary maximal positive basis vectors in two dimensions ($R^2$). Vector 10, vector 12, vector 14 and vector 16, which use point O as their origin and are perpendicular to their adjacent vectors, form a set of maximal positive basis vectors in two-dimensional space. On the other hand, FIG. 1B shows an exemplary minimal positive basis vectors in the same dimensions. Vector 18, having the same origin as vector 10 and vector 12, forms a 135 degrees angle with both of the vectors. The three vectors form a set of minimal positive basis vectors in two-dimensional space.

In utilizing a pattern search algorithm, most of the computation time is spent evaluating the objective function. One single evaluation of the objective function can take anywhere from a few seconds (inexpensive) to several minutes (expensive). Using a set of maximal positive basis vectors (maximum number of evaluations per iteration) in a pattern search algorithm enables one to find the optimal solution of an objective function if there is one. However, using a set of minimal positive basis vectors (minimum number of evaluations per iteration) with a pattern search algorithm can sometimes cause the algorithm to stop at a horse saddle and "think" that a solution has been found. A method is needed for pattern search algorithms that do not utilize a set of maximal positive basis vectors such that an optimal solution to an objective function can still be as reliably found as methods using a set of maximal positive basis vectors.

SUMMARY

The present invention solves the above-identified problem. The present invention rotates the vectors to increase the number of search directions while keeping the same number of vectors that form the positive basis for the same dimensions.

In one embodiment of the present invention, a method of finding a solution of an optimization problem utilizing a pattern search algorithm in a technical computing environment is disclosed. The method includes finding a first set of vectors for use to find a solution of the optimization problem. The method also includes applying the first set of vectors as search directions in the pattern search algorithm to attempt to generate a first result. The method further includes rotating the first set of vectors to obtain a second set of vectors. The method also further includes applying the second set of vectors as new search directions in the pattern search algorithm to generate a second result.

In one aspect of the present invention, the method further includes failing to generate the first result when applying the first set of vectors as search directions in the pattern search algorithm. In another aspect of the present invention, the first set of vectors is a set of n+1 positive basis vectors in n dimensions. In yet another aspect of the present invention, the method further includes rotating the first set of vectors by 180 degrees to obtain the second set of vectors. In still another aspect of the present invention, the method further includes rotating the first set of vectors by a random angle to obtain the second set of vectors.

In another embodiment of the present invention, a method of finding a solution of an optimization problem utilizing a pattern search algorithm in a technical computing environment is disclosed. The method includes finding a first set of vectors for use to find the solution of the optimization problem. The method also includes rotating the first set of vectors to obtain a second set of vectors. The method further includes identifying a point as the origin of the first set of vectors and the second set of vectors, wherein said point is provided as input to a function representing the optimization problem, said function generates an output. The method also further includes applying alternatively the first and second set of vectors as search directions in the pattern search algorithm to find new points that yield a more favorable output than the origin point, the new points are used as the origin for the vectors in the successive iterations. The method lastly includes deciding programmatically the solution of the optimization problem is found when a stopping condition is reached.

In one aspect of the present invention, the stopping condition is when a pattern size is smaller than a pre-determined value, a pattern size being a length along the search directions. In another aspect of the present invention, the method applies alternatively the first and second set of vectors as search directions by applying the first set of vectors as search directions; upon failure to obtain a new point that yields a more favorable output than the origin point, applying the second set of vectors as search directions. In yet another aspect of the present invention, the method applies alternatively the first and second set of vectors as search direction by applying the first set of vectors as search directions, upon failure to obtain a new point that yields a more favorable output than the origin point, reducing the pattern size and applying the second set of vectors as search directions.

In yet another embodiment of the present invention, a medium holding computer executable code for a method of finding a solution of an optimization problem utilizing a pattern search algorithm is disclosed. The method includes finding a first set of vectors for use to find the solution of the optimization problem. The method also includes applying the first set of vectors as search directions in the pattern search algorithm to attempt to generate a first result. The method further includes rotating the first set of vectors to obtain a second set of vectors. The method also further includes applying the second set of vectors as new search directions in the pattern search algorithm to generate a second result.

In still another embodiment of the present invention, a medium holding computer executable instructions for a method of finding a solution of an optimization problem utilizing a pattern search algorithm is disclosed. The method includes finding a first set of vectors for use with finding a solution of the optimization problem. The method also includes rotating the first set of vectors to obtain a second set of vectors. The method further includes identifying a point as the origin of the first set of vectors and the second set of vectors, wherein said point is provided as input to a function representing the optimization problem, said function generates an output. The method also further includes applying alternatively the first and second set of vectors as search directions in the pattern search algorithm to find new points that yield a more favorable output than the origin point. The method lastly includes deciding programmatically the solution of the optimization problem is found when a stopping condition is reached.

In still another embodiment of the present invention, a system for applying a pattern search algorithm to an optimization problem is disclosed. The system includes a programming environment for manipulating and analyzing the optimization problem. The system further includes an optimization module deploying the pattern search algorithm for rotating search directions when a set of non-maximal basis vectors is used as search directions.

In one aspect of the present invention, the system further comprises a storage medium storing said system and providing said system for distribution over a network. In another aspect of the present invention, the pattern search algorithm identifies a first set of vectors as search directions, and rotating the first set of vectors to obtain a second set of vectors as alternative search directions. In yet another aspect of the present invention, the second set of vectors is obtained by rotating the first set of vectors by 180 degrees.

DETAILED DESCRIPTION

The present invention discloses a method for improving the performance of a pattern search algorithm when using a set of non-maximal positive basis vectors as search directions. The present invention rotates the vectors to increase the number of search directions. The present invention finds an optimal solution of an objective function using a non-maximal positive basis in the pattern search algorithm and the solution is at least as reliable as using a set of maximal positive basis vectors in the pattern search algorithm.

Figure 2A:
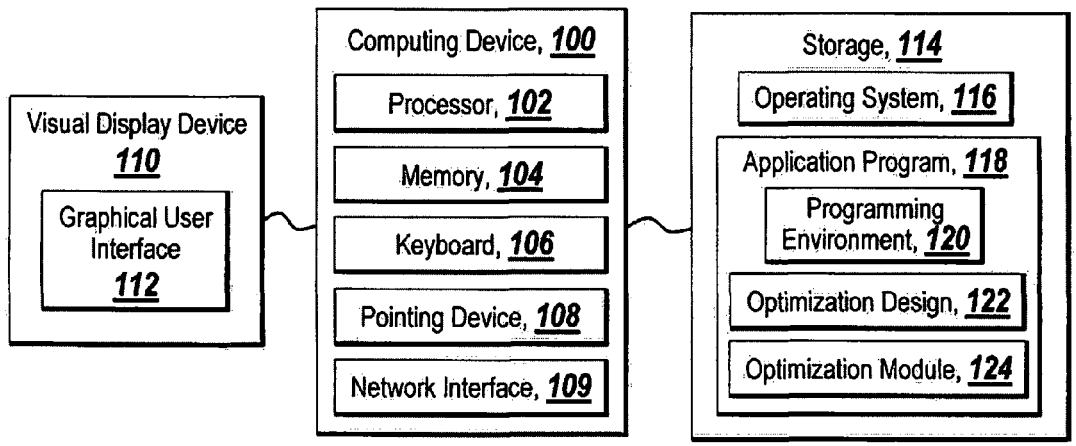
FIG. 2A illustrates a suitable environment for practicing the present invention in a single-computer computing environment.

FIG. 2A depicts an environment suitable for practicing an illustrative embodiment of the present invention. The environment includes a computing device 100 having memory 104, on which application program 118 according to one embodiment of the present invention may be stored, a processor 102 for executing the application program 118 stored in memory 104, and other programs for controlling system hardware. The computing device 100 may be any computer system such as a desktop computer, laptop, workstation, server, handheld computer, or other form of computing device that has sufficient processor power and memory capability to practice the present invention. The memory 104 may comprise a computer system memory or random access memory such as DRAM, SRAM, etc. The memory 104 may comprise other types of memory as well or combination thereof. A visual display 110, which includes a graphical interface, enables a user to interact with the computing device 100. The visual display 100 can be a computer monitor, TV, projector, and the like.

The computing device 100 may also include other devices, such as a keyboard 106, a pointing device 108 that may be connected to the visual display device 110. The computing device 100 may also include other peripherals to practice the present invention. The computing device 100 may further comprising a storage 114, such as a hard drive or CD-ROM, for storing operating system 116 and other software, and for storing application program 118 which includes programming environment 120, optimization problem 122, and optimization module 124. Those skilled in the art will appreciate that optimization module 124 is adaptable to be included as part of the application program 118 or a stand alone application that responds to calls from the application program 118. The illustrative embodiments is described relative to a MATLAB® based application, however, one of ordinary skill in the art will appreciate that the present invention may be applied to other technical computing environments, such as those using software products of LabVIEW® from National Instruments, Inc., or SystemView® from Elanix, or Mathematica® from Wolfram Research, Inc., or Mathcad from Mathsoft Engineering & Education Inc., or Maple™ from Maplesoft, a division of Waterloo Maple Inc, and the like.

Furthermore, the computing device 100 may include a network interface 109 to interface to a Local Area Network, Wide Area Network or the Internet through a variety of connections including, but not limited to, standard telephone lines, broadband connections, wireless connections, or some combination of any or all of the above. The network interface 109 may comprise a network adapter, a network card, or other devices that is suitable for interfacing the computing device 100 to any type of network capable of communication and practicing the present invention.

Figure 2B:
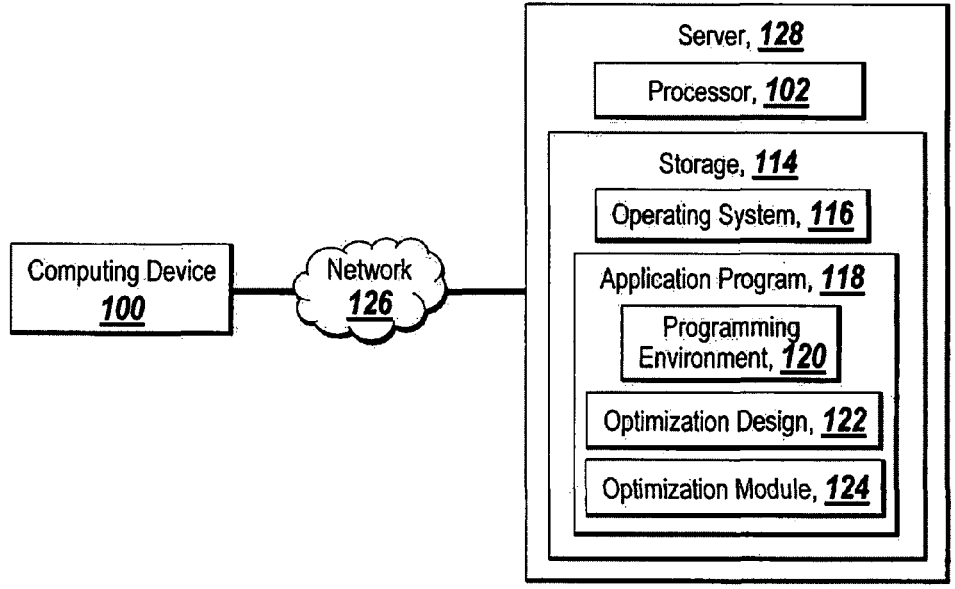
FIG. 2B illustrates a suitable environment for practicing the present invention in a client-server computing environment.

FIG. 2B illustrates an environment suitable for practicing the present invention in a client-server computing environment. Computing device 100 is coupled to a network 126, such as the Internet or an intranet, or other network either wired, wireless or a hybrid of wired or wireless. The server 128 coupled to the network 126 is adaptable to include processor 102' and storage 114' for storing operating system 116' and application program 118' which includes programming environment 120', optimization problem 122' and an optimization module 124'. Those skilled in the art will appreciate that optimization module 124' is adaptable to be included as part of the application program 118' or a stand alone application, either on the server 128 or elsewhere on the network, that responds to calls from the application program 118'. In this manner, any number of users is able to access the application program 118' via network 126 without the need to have a local copy (for example, application program 118) of the application program 118' on the storage 114. Alternatively, application program 118 on computing device 100 can be run on the server 128, utilizing its processing capability of processor 102'. Those skilled in the art will recognize that there are many other possibilities to practice the present invention in a client-server computing environment.

Figure 2C:
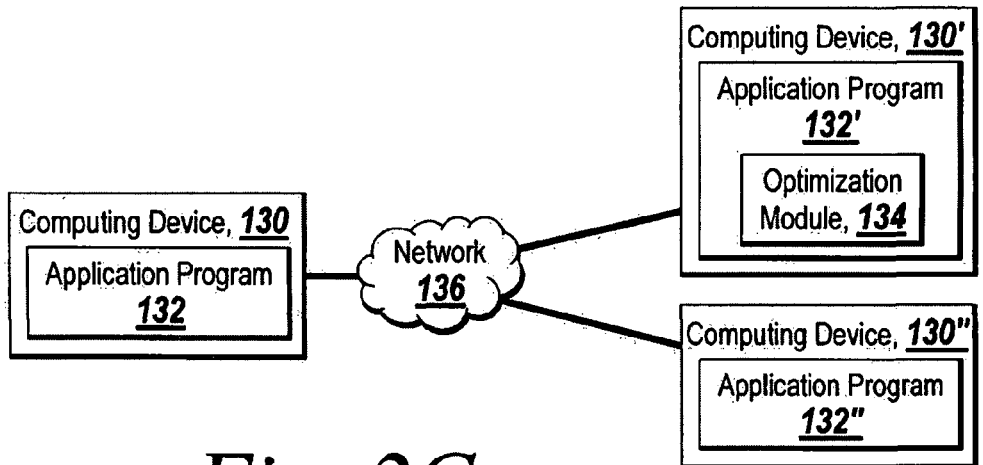
FIG. 2C illustrates a suitable environment for practicing the present invention in a distributed computing environment.

FIG. 2C depicts a suitable distributed computing environment for practicing the present invention. In this environment, a first computing device 130, a second computing device 130', and a third computing device 130" are coupled to a network 136, such as the Internet or an intranet, or other network either wired, wireless or a hybrid of wired or wireless. Computing devices 130, 130' and 130" may be any computer system such as a desktop computer, laptop, workstation, server, handheld computer, or other form of computing device that is capable of communication via network 136. Application program 132, application program 132' and application program 132" resides on computing device 130, computing device 130', and computing device 130" respectively. One of ordinary skill in the art will appreciate that functionality of the application program 132 can be either duplicated or distributed across multiple computing devices (130, 130', and 130") so that when the multiple computing devices work in communication and in collaboration with each other, the combination has the functionality of the overall application.

Optimization module 134 is illustrated as part of computing device 130'; however, those skilled in the art will recognized that optimization module can be a part of either the application program 132', application program 132, or application program 132". Alternatively, optimization module can be a stand alone application, residing in either of the computing devices 130, 130' or 130", which responds to calls from one or more of application programs 132, 132' and 132".

Those skilled in the art will further appreciate that the configuration in FIG. 2C can be equally applied to parallel execution of an application program in multiple execution environments, wherein the execution environments can be any one of the technical computing environments described herein. One skilled in the art will appreciate that there are many possible configurations to practice the present invention and the examples listed here is not meant to be limiting.

Figure 3:
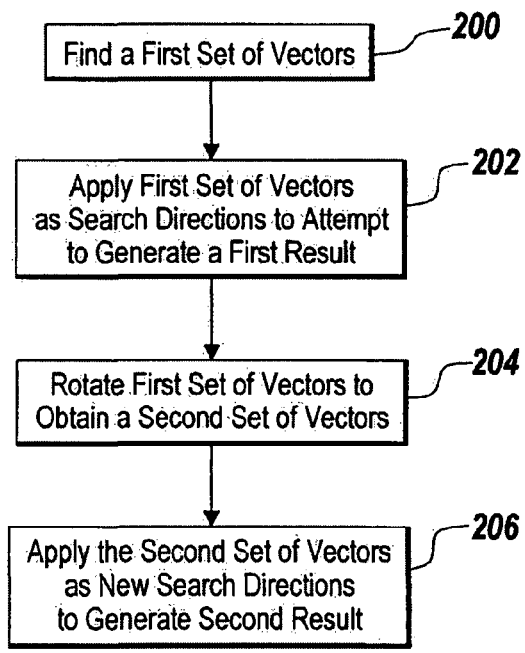
FIG. 3 shows a flowchart depicting the steps taken to practice one embodiment of the present invention.
Figure 4A:
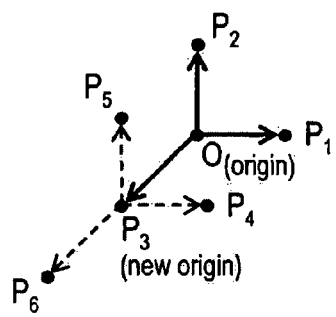
FIG. 4A illustrates an example of how a pattern search algorithm works using a set of minimal positive basis vectors in two dimensions as search directions.
Figure 4C:
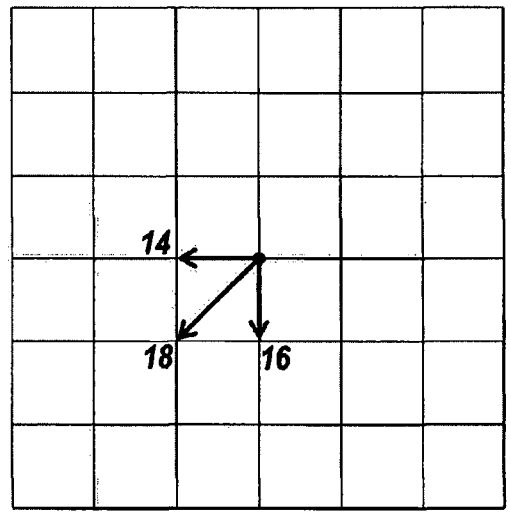
FIG. 4C illustrates components of a vector in two dimensions.
Figure 4B:
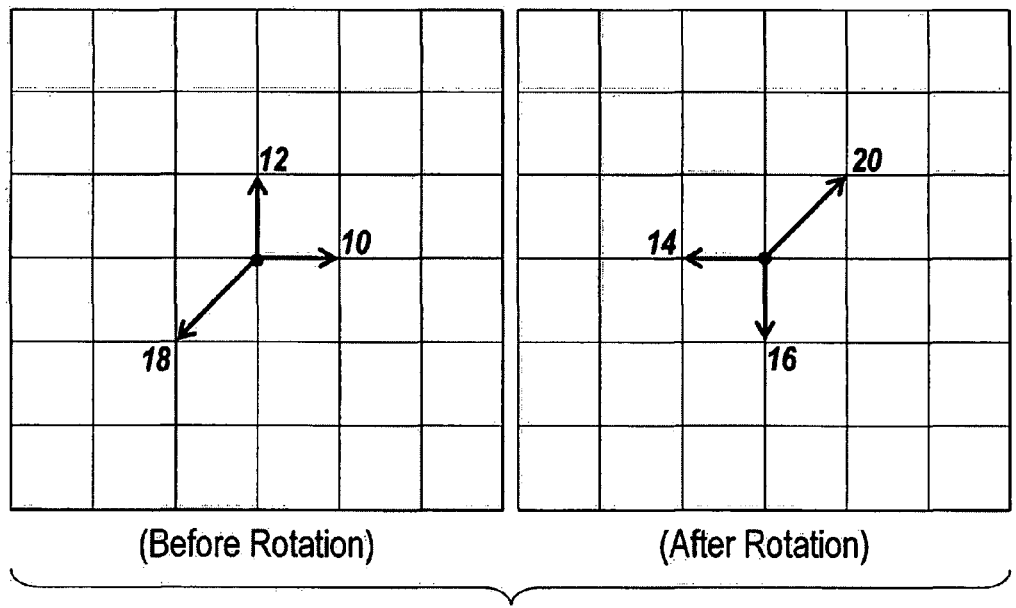
FIG. 4B illustrates the set of minimal positive basis vectors as shown in FIG. 1B before and after a rotation of 180 degrees.

FIG. 3 shows a flowchart depicting the steps taken to practice one embodiment of the present invention. FIG. 4A, FIG. 4B, and FIG. 4C are discussed in connection with FIG. 3. FIG. 4A is an example of how a pattern search algorithm works using a set of minimal basis vectors as search directions in two dimensions. FIG. 4B illustrates the set of minimal basis vectors before and after rotation. FIG. 4C illustrates components of a vector in two dimensions.

Figure 1A:
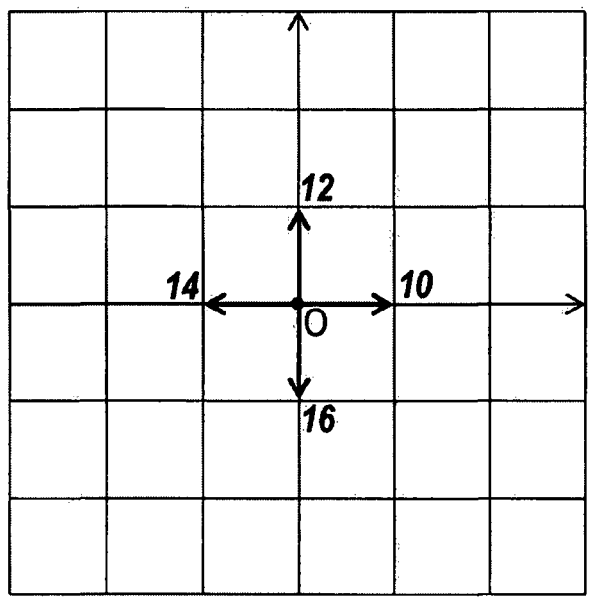
FIG. 1A illustrates exemplary maximal positive basis vectors in two-dimensional space.
Figure 1B:
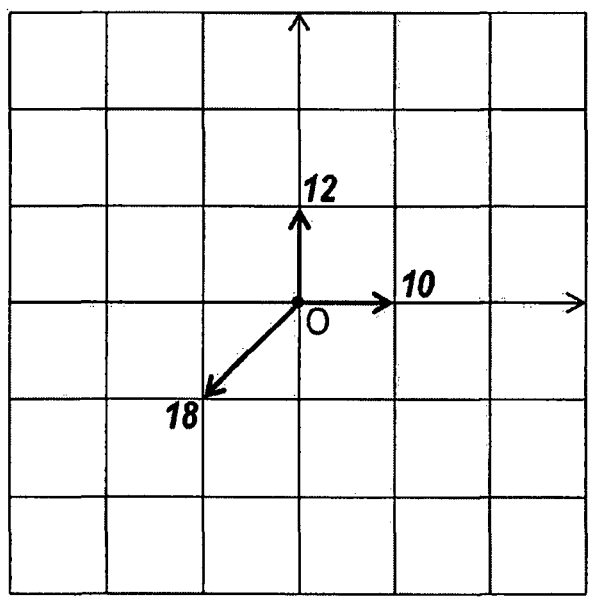
FIG. 1B illustrates exemplary minimal positive basis vectors in two-dimensional space.

In utilizing a pattern search algorithm to find a solution of an optimization problem, a first set of vectors is found (step 200). In one embodiment, the first set of vectors is a set of minimal (n+1) positive basis vectors in n dimensions. FIG. 1B illustrates one set of such vectors in two dimensions. The first set of vectors is then applied as search directions to attempt to generate a first result (step 202). As an example, the set of vectors in FIG. 1B is used as the first set of vectors and an initial iterate O is identified. This point is provided as input to a function representing the optimization problem and the function produces an associated output. The output is stored in memory where the objective function retrieves the best solution it has found so far. As shown in FIG. 4A, using point O as the origin, and vectors 10, 12, and 18 as search directions, point $P_1$, point $P_2$, and point $P_3$ are obtained by advancing in the search directions, from the origin, by a predetermined pattern size specifying a length. Point $P_1$, point $P_2$, and point $P_3$ are then provided as input to the objective function and the objective function produces three outputs corresponding to the three points. Assuming that point $P_3$ yields the most favorable output compared to both point $P_1$ and point $P_2$ and also yields a more favorable output than the current iterate O.

Point $P_3$ is then identified as the next iterate. Alternatively, the next iterate can be identified as soon as a first point in the pattern is found to yield a more favorable output than the current iterate.

The output of point $P_3$ replaces the value in memory where the best solution so far is stored. Applying the same set of vectors (10, 12 and 18) as search directions using the new iterate $P_3$ as origin, point $P_4$, point $P_5$, and point $P_6$ are then obtained using the same pattern size. The objective function then evaluates these three points in the pattern and determines if anyone yields a more favorable output than the current stored best output. If so, the next iterate is found and the iteration continues.

If an attempt to find a more favorable solution fails with the first set of vectors, a new set of vectors to be used as new search directions is required. By rotating the first set of vectors, a second set of vectors is obtained (step 204). Taking the vectors 10, 12, 18 in FIG. 1B as an example, rotating each vector by 180 degrees and the resultant set of vectors is shown in FIG. 4B. Vectors 14, 16, and 20 are obtained from rotating vectors 10, 12, and 18, respectively.

In order to better demonstrate why rotating vectors helps to find a better solution for the optimization problem, an example situation is given here. Imagine that at some iterate $P_n$, vectors 10, 12 and 18 are applied as search directions using the iterate as the origin. The example situation has the condition that there is a slight increase in the direction of vector 10, and a dramatic increase in the direction of vector 12. One of ordinary skill can appreciate that vector 18 can be decomposed to be represented by two vectors 14 and 16 perpendicular to each other as shown in FIG. 4C. The example situation also has the condition that there is a fast increase in the direction of vector 16 and a very slow decrease in the direction of vector 14. This specific example can result in an overall increase in the vector 18 direction. Therefore, in this specific example, observing at point $P_n$, there is an increase in all the three search directions as defined by vector 10, 12 and 18, and the pattern search algorithm would fail to find a more favorable point using the current set of vectors 10, 12 and 18.

Therefore, if only using vectors 10, 12 and 18 in a typical pattern search algorithm to find an optimal solution for an optimization problem, it is possible that a non-optimal solution is reached. However, by rotating these vectors by 180 degrees as shown in FIG. 4B, vectors 14, 16, and 20 are applied as new search directions, and since there is a very slow decrease in the vector 14 direction, a new iterate can be found using this new set of search directions. Furthermore, due to the 180 degrees of rotation, the present invention covers six search directions in two dimensions and vectors 10, 12, 14, and 16 form a set of maximal positive basis vectors. Therefore, the present invention is at least as reliable as a pattern search algorithm utilizing a set of maximal positive basis vectors as search directions.

In a preferred embodiment of the present invention, the first set of vectors is rotated by 180 degrees to obtain the second set of vectors. In another embodiment of the present invention, the first set of vectors is rotated by a random angle to obtain the second set of vectors. The second set of vectors is applied as new search directions to generate a second result (step 206).

Figure 5:
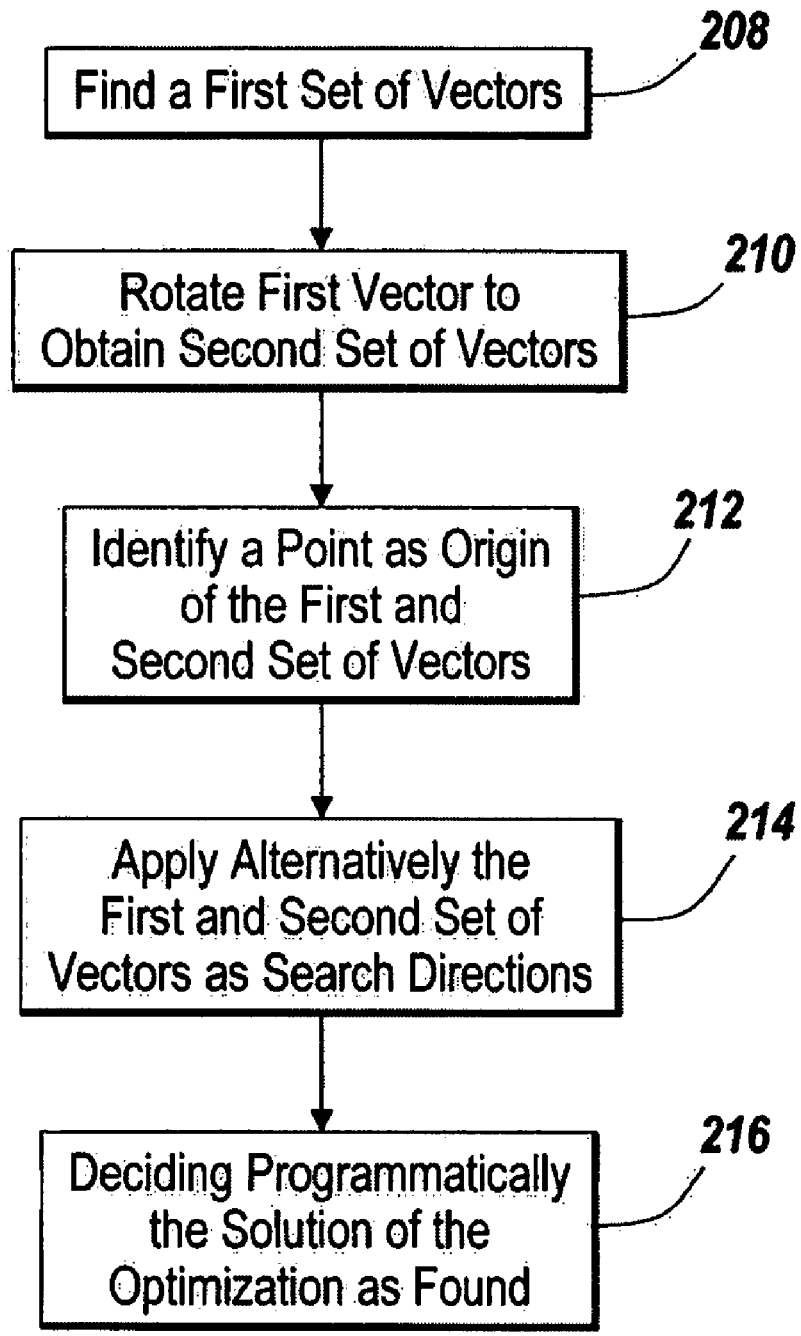
FIG. 5 shows a flowchart depicting the steps taken to practice another embodiment of the present invention.

FIG. 5 shows a flowchart depicting the steps taken to practice another embodiment of the present invention. In utilizing a pattern search algorithm to find a solution of an optimization problem, a first set of vectors is found (step 208). The second set of vectors is obtained by rotating the first set of vectors (step 210). A point is identified as the origin of the first and second set of vectors (step 212). The point is provided as input to a function representing the optimization problem. The function generates an output. The first set of vectors and the second set of vectors are applied as search directions alternatively in the pattern search algorithm to find new points that yield a more favorable output than the origin point (step 214). In one embodiment of the present invention, the first set of vectors is applied as search directions first to find a new point that yields a more favorable output, and upon failure, the second set of vectors is applied as search directions next to find a new point that yields a more favorable output. In another embodiment of the present invention, the first set of vectors is applied as search directions, and upon failure to obtain a new point that yields a more favorable output than the origin point, the pattern size is reduced and the second set of vectors is applied as search directions to find a new point that yields a more favorable output. When a stopping condition is reached, it is decided programmatically the solution is found (step 216). In one embodiment of the present invention, the stopping condition is when a pattern size representing a distance between the origin point and the new point is smaller than a predetermined value.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method for improving performance of a pattern search that seeks a solution to an optimization problem in a technical computing environment on a computing device, comprising:
   identifying, with the computing device in the technical computing environment, a first set of vectors that form a positive basis for use with the optimization problem, the first set of vectors associated with an origin;
   rotating the first set of vectors, using the computing device, to obtain a second set of vectors that form a positive basis for use with the optimization problem, the second set of vectors associated with the origin;
   applying a first point, associated with the origin, to a function to generate a first output, using the computing device, the function representing the optimization problem;
   applying, using the computing device, alternately the first set of vectors and the second set of vectors as search directions in the pattern search to find a second point that, when applied to the function, yields a more favorable output than the first output to improve performance of the pattern search in the technical computing environment on the computing device; and
   storing the second point in a storage.

2. A method as defined in claim 1 further comprising:
   with the computing device, using the second point as the origin for the first set of vectors and the second set of vectors in a successive iteration.

3. A method as defined in claim 2 further comprising:
   with the computing device, determining a solution of the optimization problem is found when a stopping condition is reached.

4. A method as defined in claim 3 wherein the stopping condition includes a condition where a pattern size is smaller than a predetermined value, the pattern size being a distance along the search directions from the origin.

5. A method as defined in claim 1 wherein the first set of vectors are rotated according to a random angle.

6. A method as defined in claim 1 wherein the first set of vectors is a set of minimal n+1 positive basis vectors in an n-dimensional space.

7. A computer-readable medium comprising computer-executable instructions that when executed cause a computing device to perform the following functions to improve performance of a pattern search that seeks a solution to an optimization problem in a technical computing environment:
   identifying, with the computing device in the technical computing device, a first set of vectors that form a positive basis for use with the optimization problem, the first set of vectors associated with an origin;
   rotating the first set of vectors, using the computing device, to obtain a second set of vectors that form a positive basis for use with the optimization problem, the second set of vectors associated with the origin;
   applying a first point, associated with the origin, to a function to generate a first output, using the computing device, the function representing the optimization problem;
   applying, using the computing device, alternately the first set of vectors and the second set of vectors as search directions in the pattern search to find a second point that, when applied to the function, yields a more favorable output than the first output to improve performance of the pattern search in the technical computing environment on the computing device; and
   storing the second point in a storage.

8. A computer-readable medium as defined in claim 7 further comprising instructions that when executed cause the computing device to perform:
   using the second point as the origin for the first set of vectors and the second set of vectors in a successive iteration.

9. A computer-readable medium as defined in claim 8 further comprising instructions that when executed cause the computing device to perform:
   determining a solution of the optimization problem is found when a stopping condition is reached.

10. A computer-readable medium as defined in claim 9 wherein the stopping condition includes a condition where a pattern size is smaller than a predetermined value, the pattern size being a distance along the search directions from the origin.

11. A computer-readable medium as defined in claim 7 wherein the first set of vectors are rotated according to a random angle.

12. A computer-readable medium as defined in claim 7 wherein the first set of vectors is a set of minimal n+1 positive basis vectors in an n-dimensional space.

13. An apparatus comprising:
   means for identifying, using an optimization module to find a solution of an optimization problem and to save computation time of the solution in a technical computing environment, a first set of vectors that form a positive basis for use with the optimization problem, the first set of vectors associated with an origin, the optimization module adaptable to be included as part of an application running in the technical computing environment;
   means for rotating the first set of vectors to obtain a second set of vectors that form a positive basis for use with the optimization problem, the second set of vectors associated with the origin;
   means for applying a first point, associated with the origin, to a function to generate a first output, the function representing the optimization problem; and
   means for applying alternately the first set of vectors and the second set of vectors as search directions in a pattern search to find a second point that, when applied to the function, yields a more favorable output than the first output.

14. An apparatus as defined in claim 13 further comprising:
   means for using the second point as the origin for the first set of vectors and the second set of vectors in a successive iteration.

15. An apparatus as defined in claim 14 further comprising:
   means for determining a solution of the optimization is found when a stopping condition is reached.

16. An apparatus comprising:
   a memory; and
   a processor configured to:
      identify, using an optimization module to find a solution of an optimization problem and to save a computation time of the solution in a technical computing environment, a first set of vectors that form a positive basis for use with the optimization problem, the first set of vectors associated with an origin, the optimization module adaptable to be included as part of an application running in the technical computing environment;
      rotate the first set of vectors to obtain a second set of vectors that form a positive basis for use with the optimization problem, the second set of vectors associated with the origin;
      apply a first point, associated with the origin, to a function to generate a first output, the function representing the optimization problem;
      apply alternately the first set of vectors and the second set of vectors as search directions in a pattern search to find a second point that, when applied to the function, yields a more favorable output than the first output; and
      store the second point in the memory.

17. An apparatus as defined in claim 16 wherein the processor is further configured to:
   use the second point as the origin for the first set of vectors and the second set of vectors in a successive iteration.

18. In a technical computing environment, a method implemented in a computing device, comprising:
   finding, using the computing device, a first set of vectors that form a positive basis for use with the optimization problem;
   rotating the first set of vectors, using the computing device, to obtain a second set of vectors that form a positive basis for use with the optimization problem;
   applying a point, representing an origin associated with the first set of vectors and the second set of vectors, to a function to generate a first output, using the computing device, the function representing the optimization problem;
   applying the second set of vectors as search directions in a pattern search to find a first set of points, using the computing device;
   applying the first set of points to the function to generate a first set of outputs, using the computing device;
   identifying an output in the first set of outputs that is more favorable than the first output, using the computing device, to improve performance of the pattern search in the technical computing environment on the computing device; and storing the output in a storage.

19. A computer-implemented method as defined in claim 18 further comprising:

using a point, associated with the identified output in the first set of outputs, as the origin for the first set of vectors and the second set of vectors in a successive iteration.

20. A computer-readable medium comprising computer-executable instructions that when executed cause a computing device to perform:

finding, using the computing device, a first set of vectors that form a positive basis for use with the optimization problem;

rotating the first set of vectors, using the computing device, to obtain a second set of vectors that form a positive basis for use with the optimization problem;

applying a point, representing an origin associated with the first set of vectors and the second set of vectors, to a function to generate a first output, using the computing device, the function representing the optimization problem;

applying the second set of vectors as search directions in a pattern search to find a first set of points, using the computing device;

applying the first set of points to the function to generate a first set of outputs, using the computing device;

identifying an output in the first set of outputs that is more favorable than the first output, using the computing device, to improve performance of the pattern search in the technical computing environment on the computing device; and storing the output in a storage.

21. A computer-readable medium as defined in claim 20 wherein the computer-readable medium further includes instructions that when executed cause the computer to perform:

using a point, associated with the identified output in the first set of outputs, as the origin for the first set of vectors and the second set of vectors in a successive iteration.

* * * * *

UNITED STATES PATENT AND TRADEMARK OFFICE
CERTIFICATE OF CORRECTION

| | | |
|---|---|---|
| PATENT NO. | : 7,606,780 B1 | Page 1 of 1 |
| APPLICATION NO. | : 11/900787 | |
| DATED | : October 20, 2009 | |
| INVENTOR(S) | : Rakesh Kumar et al. | |

It is certified that error appears in the above-identified patent and that said Letters Patent is hereby corrected as shown below:

On the title page, at Item (73) Assignee, replace "The Math Works, Inc." with --The MathWorks, Inc.--.

Signed and Sealed this
Second Day of December, 2014

Michelle K. Lee
*Deputy Director of the United States Patent and Trademark Office*